(12) United States Patent
Shen et al.

(10) Patent No.: US 10,630,746 B1
(45) Date of Patent: Apr. 21, 2020

(54) STREAMING PLAYLIST INCLUDING FUTURE ENCODED SEGMENTS

(71) Applicant: Twitch Interactive, Inc., San Francisco, CA (US)

(72) Inventors: Yueshi Shen, Cupertino, CA (US); Martin Hess, Soquel, CA (US); Shawn Hsu, San Jose, CA (US); Eran Ambar, Sunnyvale, CA (US); Abhinav Kapoor, Fremont, CA (US); Jorge Arturo Villatoro, San Francisco, CA (US); Spencer Nelson, Brooklyn, NY (US); Jeffrey Garneau, Durham, NC (US); Cyrus Hall, San Francisco, CA (US); Jyotindra Vasudeo, Berkeley, CA (US); Andrew Francis, San Francisco, CA (US); Yuechuan Li, Issaquah, WA (US); Chih-Chiang Lu, Fremont, CA (US)

(73) Assignee: Twitch Interactive, Inc., San Francisco, CA (US)

( * ) Notice: Subject to any disclaimer, the term of this patent is extended or adjusted under 35 U.S.C. 154(b) by 50 days.

(21) Appl. No.: 15/720,230

(22) Filed: Sep. 29, 2017

(51) Int. Cl.
*H04L 29/06* (2006.01)
*H04N 21/2187* (2011.01)
*H04N 21/262* (2011.01)

(52) U.S. Cl.
CPC ........ *H04L 65/607* (2013.01); *H04L 65/4069* (2013.01); *H04L 65/60* (2013.01); *H04N 21/2187* (2013.01); *H04N 21/26258* (2013.01); *H04L 65/608* (2013.01)

(58) Field of Classification Search
CPC ... H04L 65/4069; H04L 65/60; H04L 65/607; H04L 65/608
See application file for complete search history.

(56) References Cited

U.S. PATENT DOCUMENTS

| | | | |
|---|---|---|---|
| 8,874,779 B2 | 10/2014 | Ma et al. | |
| 10,003,811 B2 | 6/2018 | Sadhwani et al. | |
| 10,114,689 B1* | 10/2018 | Yang | G06F 11/2048 |
| 2010/0312828 A1 | 12/2010 | Besserglick et al. | |
| 2010/0318600 A1 | 12/2010 | Furbeck | |
| 2013/0185452 A1* | 7/2013 | Burckart | H04L 65/4084 709/231 |
| 2013/0308699 A1 | 11/2013 | Musser, Jr. et al. | |

(Continued)

OTHER PUBLICATIONS

U.S. Appl. No. 15/720,438, filed Sep. 29, 2017, Shen et al.

*Primary Examiner* — Jeong S Park
(74) *Attorney, Agent, or Firm* — BakerHostetler

(57) ABSTRACT

Techniques for low latency streaming, for example in a broadcasting environment, are described herein. In some examples, a playlist may include both currently encoded segments, which are segments that are fully encoded at or before playlist generation, and also future encoded segments, which are segments that have not yet been fully encoded at playlist generation. In some cases, the inclusion of future encoded segments in a playlist may result in a player requesting a segment that has not yet been fully encoded at the time that the request is received by the server. In some examples, even though the segment is not yet fully encoded, the server may nevertheless save and process the request, for example by transmitting encoded portions of the requested segment as those portions are made available by the encoder.

16 Claims, 12 Drawing Sheets

(56) References Cited

U.S. PATENT DOCUMENTS

| | | | |
|---|---|---|---|
| 2014/0229976 A1* | 8/2014 | Ma | H04N 21/23439 |
| | | | 725/32 |
| 2014/0359680 A1* | 12/2014 | Shivadas | H04N 21/85406 |
| | | | 725/90 |
| 2017/0195744 A1* | 7/2017 | Engel | H04N 21/2187 |
| 2017/0223349 A1 | 8/2017 | Cheng et al. | |
| 2017/0289228 A1* | 10/2017 | Romrell | H04L 65/605 |
| 2018/0063602 A1* | 3/2018 | Kalish | H04L 65/4084 |
| 2018/0205778 A1 | 7/2018 | Forman et al. | |

* cited by examiner

Future Encoded Segment Playlist 146

| |
|---|
| Data 311: Information for Segment 211 |
| Data 312: Information for Segment 212 |
| Data 313: Information for Segment 213 |
| Data 314: Information for Segment 214 |
| Data 315: Information for Segment 215 |
| Comment 316: Information for Segment 216 |
| Comment 317: Information for Segment 217 |
| Comment 318: Information for Segment 218 |

FIG. 3

STREAMING PLAYLIST INCLUDING FUTURE ENCODED SEGMENTS

BACKGROUND

The popularity of video streaming has increased rapidly in recent years. In some examples, video of a live event, such as a video game, news event, sporting event, etc. may be captured and streamed to viewers over one or more networks. In these cases, it may be desirable for video to be transmitted with low latency, for example such that actions within video may be seen by viewers while they are still occurring or shortly after their occurrence. This may, in some cases, be particularly advantageous when users are commenting, chatting or otherwise describing actions within these live events. In some examples, latency reduction may be particularly challenging when video content is being broadcast, meaning that it is being transmitted from a provider to multiple different viewers. Latency reduction may be more challenging in broadcast scenarios, for example as opposed to point-to-point transmissions, because provider resources in broadcast scenarios are not entirely focused on a particular single viewer.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 3 is diagram illustrating an example future encoded segment playlist that may be used in accordance with the present disclosure.

DETAILED DESCRIPTION

Figure 1:
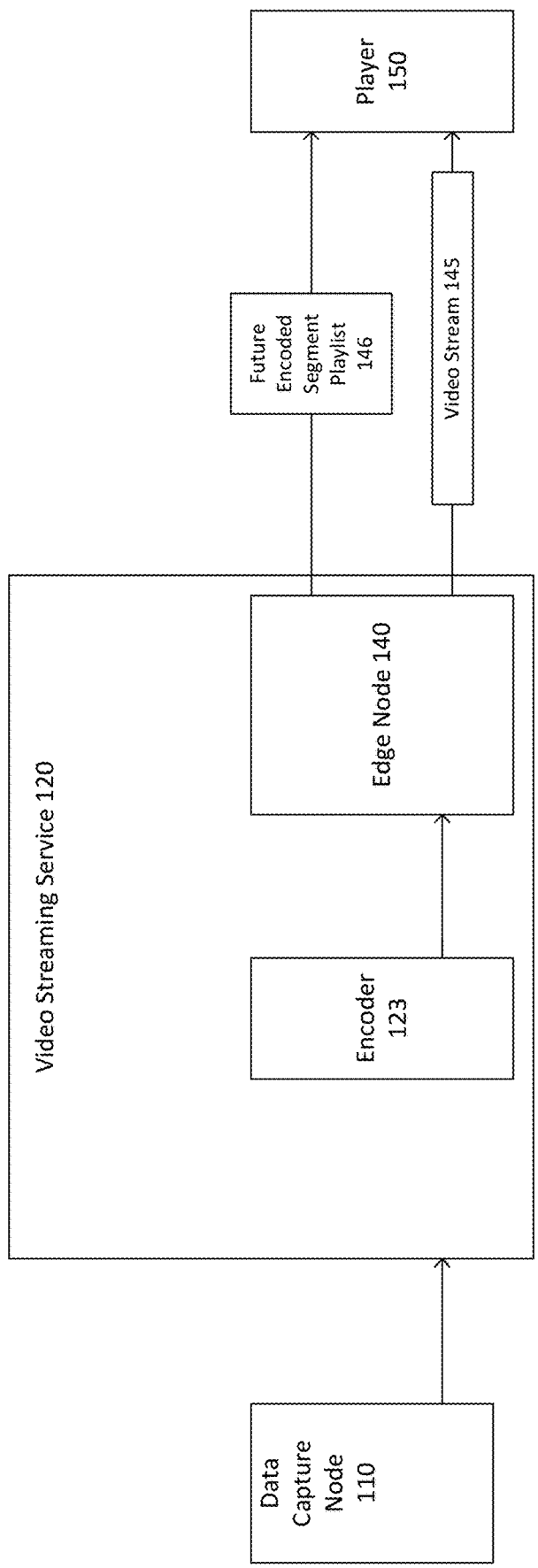
FIG. 1 is a diagram illustrating an example low latency video transmission system that may be used in accordance with the present disclosure.

Various techniques for low latency streaming, for example in a broadcasting environment, are described herein. The described techniques may employ various combinations of one or more features that, when employed individually or in combination, may reduce latency, in many cases substantially and without unreasonable negative impact on cost or quality. In some examples, the described techniques may be employed for streaming of video corresponding to a live event, such as a video game, sporting event, news event, or other live event. In some cases, the described techniques may allow actions within video to be seen by viewers while they are still occurring are shortly after their occurrence. In some examples, the described techniques may be employed by a video streaming service that receives encoded video captured and transmitted from a remote source, and then decodes and re-encodes the received video for transmission to multiple remote viewers. Additionally, in some examples, the described techniques may be employed in an adaptive bitrate streaming context, in which video is encoded into multiple different renditions having different respective image qualities (e.g., bitrates, resolutions, profiles, frame rates, etc.) and appropriate renditions are selected, and dynamically switched, for individual viewers based on changing network conditions and other characteristics.

One example latency reduction feature described herein involves providing a playlist that may include both currently encoded segments and also future encoded segments, which are segments that have not yet been fully encoded at the time that the playlist is generated. In many streaming protocols, such as hypertext transfer protocol (HTTP), playlists may be provided to a player to identify segments that may be requested by the player for transmission to the player. In some examples, playlists may be generated by an encoder at a server that transmits the streaming video content, and the playlists may be requested from the server by a player at a remote client that receives the streaming video content. Traditional playlists for streaming video content may include only currently encoded segments that have been fully encoded for transmission at or before the time that the playlists are generated. By including only fully encoded segments, these traditional playlists may prevent clients from requesting segments that have not yet been encoded, which may result in errors in delivering and/or playing the streaming video content. While the traditional playlists may be helpful in preventing such errors, the traditional playlists may also be problematic because they may contribute to latency associated with transmitting and playing of streaming video content. In particular, when using traditional playlists, players may need to wait to request and receive a new playlist in order to request and play a recently encoded segment. The time required to request, generate, transmit, receive, and/or process this new playlist may therefore contribute to latency when using traditional playlists.

In contrast to these traditional playlists, the playlists described herein may include both currently encoded segments and also future encoded segments, which have not yet been fully encoded at the time that the playlist is generated. By including future encoded segments in a playlist, latency associated with transmitting and playing of streaming video content may be reduced. In particular, by including future encoded segments in a playlist, the likelihood that a player will be able to identify and request a most recently encoded segment may be increased. This may reduce the likelihood that the player will need to wait to request and receive a new playlist in order to play a recently encoded segment, thereby reducing latency. Moreover, by including future encoded segments in a playlist, the quantity of segments in the playlist may be increased, which may reduce a frequency at which the player requests updating of the playlist. By reducing the frequency at which playlists are updated, the workload on the player may be reduced and the player's performance may be improved.

Additionally, the inclusion of future encoded segments in playlists may also improve video streaming by helping to ensure that the playlists are not out-of-date when they are eventually received by the player. For example, in some cases, there may be a time delay between a time that the playlist is generated (e.g., by an encoder) and a time that the playlist is eventually received by the player. In some examples, this time delay may be increased in scenarios when video content passes through an intermediary, such as one or more intermediate content delivery networks (CDNs) and/or other components, which may be between the encoder and the player. In some cases, if this time delay becomes long enough, a playlist may become out-of-date by the time that it is received by the player. For example, a playlist may be considered out-of-date when all of the segments included in the playlist have already been requested by the player by the time that the playlist is eventually received by the player. Thus, by including additional future encoded segments in a playlist, the likelihood that the playlist will become out-of-date when it is received by the player may be reduced.

In some cases, the inclusion of future encoded segments in a playlist may result in a player requesting a segment that has not yet been fully encoded (e.g., that is only partially encoded or not encoded at all) at the time that the request is received by the server. In some examples, even though the segment is not yet fully encoded, the server may nevertheless save and process the request, for example by transmitting encoded portions (e.g., frames) of the requested segment as those portions are made available by the encoder. The ability to process requests in this manner may provide a number of advantages. For example, by having its requests saved and processed as encoded content becomes available, the player may be spared from having to re-issue multiple duplicate requests for the same segment, thereby reducing computational burden on the player and improving efficiency. Additionally, by transmitting encoded portions of the requested segment as those portions are made available by the encoder, the encoded content may be transmitted more promptly to the player, thereby further reducing latency.

In some cases, not all players may be capable of requesting and processing future encoded segments. For example, in some cases, only certain players may be programmed with logic to submit requests for segments that have not yet been fully encoded and to wait for encoded portions of those segments to be made available by the encoder. By contrast, other players may be traditional players that are not programmed with such logic and that may fail or enter an error condition if they were to request a future encoded segment. In some examples, when a playlist includes future encoded segments, the future encoded segments may be included as comments within the playlist. This may allow the playlists to be used by both players that are capable of requesting and processing future encoded segments as well as traditional players that do not have this capability. For example, in some cases, the players that are capable of requesting and processing future encoded segments may be provided with logic to read and process the future encoded segments that are included within the playlist comments. By contrast, the traditional players may simply ignore the comments without being made aware of the future encoded segments, thereby eliminating the possibility that these players will fail or enter an error condition.

FIG. 1 is a diagram illustrating an example low latency video transmission system that may be used in accordance with the present disclosure. As shown in FIG. 1, video content may be captured at a data capture node 110 and transmitted to a video streaming service 120, which, in turn, may transmit the video content to player 150 via video stream 145. In some examples, video may be transmitted from data capture node 110 to video streaming service 120 and, in turn, from video streaming service 120 to player 150 over one or more communications networks, for example one or more local area networks (LAN's) and/or one or more wide area networks (WAN's), such as the Internet. Additionally, in some examples, video may be transmitted from data capture node 110 to video streaming service 120 and, in turn, from video streaming service 120 to player 150 using streaming transmission techniques, in which portions of transmitted content may be received and played while subsequent portions of the transmitted content are being transmitted. In some examples, the video content captured and transmitted by data capture node 110 may include video of a live event, such as a video game, sporting event, news event, or other live event. In some examples, users may be commenting, chatting or otherwise describing actions within these live events. In these and other cases, it may be particularly advantageous to reduce and minimize latency for video of live events.

In some examples, video capture node 110 may capture video using screen capture software, one or more cameras, and/or other video capture components. In the example of FIG. 1, video capture node 110 may transmit the captured video to video streaming service 120 over one or more networks. The transmitted video may be received by video streaming service 120. Encoder 123 at the video streaming service 120 may encode the video for transmission to player 150 over one or more networks. Edge node 140 may then transmit the encoded video to player 150.

In some examples, video may be transmitted from the video streaming service 120 to player 150 using a communications protocol such as hypertext transfer protocol (HTTP) or another communications protocol that enables streaming transmission of content. Additionally, in some examples, video may be transmitted from the video streaming service 120 to player 150 using adaptive bitrate streaming, in which video is encoded into multiple different renditions having different respective image qualities (e.g., bitrates, resolutions, profiles, frame rates, etc.) and appropriate renditions are selected, and dynamically switched, for individual viewers based on changing network conditions and other characteristics. In some examples, encoder 123 may encode the source video content received from the video capture node 110 into the multiple different renditions. Also, in some examples, player 150 may select and switch between different renditions based on characteristics such as those described above.

As will be described in detail below, in combination with video stream 145, video streaming service 120 may generate and transmit at least one future encoded segment playlist 146 to player 150. Thus, player 150 may be a recipient of the video stream 145 and the future encoded segment playlist 146. Future encoded segment playlist 146 may include both currently encoded segments, which are segments that are fully encoded at or before the time that the playlist 146 is generated, and also future encoded segments, which are segments that have not yet been fully encoded at the time that the playlist 146 is generated. Future encoded segment playlist 146 may be provided to player 150 to identify segments that may be requested by the player 150 for transmission to the player 150. In some examples, future encoded segment playlist 146 may be generated by encoder 123, which encodes video stream 145 for transmission from video streaming service 120 to player 150. In some examples, player 150 may periodically request a new and/or updated future encoded segment playlist 146 from the video streaming service 120, such as when a current playlist 146 becomes, or is about to become, out-of-date. In some examples, future encoded segment playlist 146 may at least partially comply with a format and/or specification of a communications protocol used for streaming of the video content.

As set forth above, traditional playlists for streaming video content may include only currently encoded segments that have been fully encoded for transmission at or before the time that the playlists are generated. By including only fully encoded segments, these traditional playlists may prevent clients from requesting segments that have not yet been encoded, which may result in errors in delivering and/or playing the streaming video content. While the traditional playlists may be helpful in preventing such errors, the traditional playlists may also be problematic because they may contribute to latency associated with transmitting and playing of streaming video content. In particular, when using traditional playlists, players may need to wait to request and receive a new playlist in order to request and play a recently encoded segment. The time required to request, generate, transmit, receive, and/or process this new playlist may therefore contribute to latency when using traditional playlists.

In contrast to these traditional playlists, the future encoded segment playlist 146 may include both currently encoded segments and also future encoded segments, which have not yet been fully encoded at the time that the playlist 146 is generated. By including future encoded segments in the playlist 146, latency associated with transmitting and playing of streaming video content may be reduced. In particular, by including future encoded segments in the playlist 146, the likelihood that the player 150 will be able to identify and request a most recently encoded segment may be increased. This may reduce the likelihood that the player 150 will need to wait to request and receive a new playlist in order to play a segment, for example in comparison to traditional playlists that include only segments that are fully encoded at or before playlist generation. Moreover, by including future encoded segments in the playlist 146, the quantity of segments in the playlist 146 may be increased, which may reduce a frequency at which the player 150 requests updating of the playlist. By reducing the frequency at which playlists are updated, the workload on the player 150 may be reduced and the player's performance may be improved.

Figure 2:
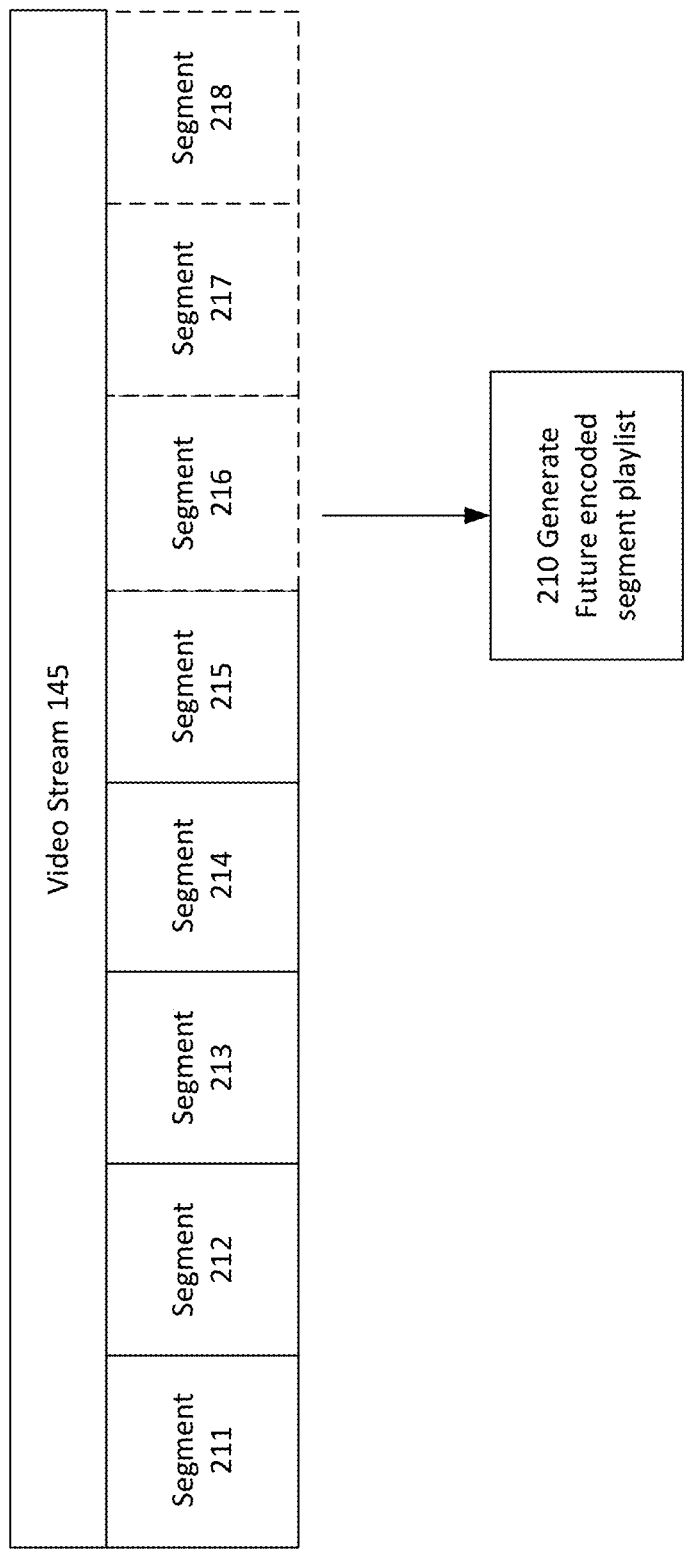
FIG. 2 is diagram illustrating example video stream segment encoding and playlist generation that may be used in accordance with the present disclosure.

Referring now to FIG. 2, some examples of video stream segment encoding and playlist generation will now be described in detail. In particular, FIG. 2 shows a portion of video stream 145 that includes segments 211-218. In some examples, each of segments 211-218 may include a number of video frames. As shown, FIG. 2 shows a time 210 at which a future encoded segment playlist 146 may be generated, for example by encoder 123. As also shown in FIG. 2, segments 211-215 are displayed with solid outlining, while segments 216-218 are displayed with dashed outlining. In this example, the solid outlining of segments 211-215 indicates that segments 211-215 are currently encoded segments that have been fully encoded at, or before, time 210 at which the future encoded segment playlist is generated. By contrast, the dashed outlining of segments 216-218 indicates that segments 216-218 are future encoded segments that have not been fully encoded at time 210 at which the future encoded segment playlist is generated. Rather, each of future encoded segments 216-218 will be become fully encoded subsequent to time 210. In some examples, one or more of segments 216-218 (e.g., segment 216) may be partially encoded at time 210. By contrast, in some examples, each of segments 216-218 may be entirely un-encoded at time 210.

It is noted that the term fully encoded, as used herein, refers to a segment in which all portions (e.g., frames) of the segment that are being encoded have already been completely encoded. By contrast, a segment that is not fully encoded is a segment in which at least one of the portions (e.g., frames) of the segment that are being encoded has not yet been completely encoded. It is noted, however, that a segment is not considered fully encoded if one or more encoded portions of the segment still need to be re-encoded, for example due to errors or other problems with an initial encoding attempt.

As described above, traditional playlists for streaming video content may include only currently encoded segments that have been fully encoded for transmission at or before the time that the playlists are generated. Thus, in the example of FIG. 2, a traditional playlist generated at time 210 may include only currently encoded segments 211-215. By contrast, a future encoded segment playlist generated at time 210 may include both currently encoded segments 211-215 and also future encoded segments 216-218.

Referring now to FIG. 3, an example future encoded segment playlist 146 will now be described in detail. As shown, future encoded segment playlist includes data 311-313, each including information for currently encoded segments 211-215, respectively. As an example, data 311 includes information for respective currently encoded segment 211. In some examples, this information may include various tags, identifiers, fields, and other collections of data. In some examples, data 311 may include a uniform resource identifier (URI), name, and/or other data that identifies segment 211. Data 311 may also indicate a location or other information for requesting and retrieving the segment 211. Also, in some examples, data 311 may also include other information associated with segment 211, such as a segment duration, a byte range, discontinuity information, an associated date and time, information for decrypting segment 211, and/or any other types of information. Each of data 312-315 may include the same and/or different information for each of their respective segments 212-215. In some examples, the format of information included in data 311-315 may at least partially comply with a format and/or specification of a communications protocol used for streaming of the video content.

As shown in FIG. 3, future encoded segment playlist 146 also includes comments 316-318, each including information for future encoded segments 216-218, respectively. As set forth above, this is in contrast to traditional playlists that may include information only for currently encoded segments 211-215. It is noted that each of comments 316-318 may themselves include multiple comments, line of comments, sub-comments, etc. In some examples, comments 316-318 may be distinguished from non-comment data 311-315 based at least in part on a format and/or specification of a communications protocol used for streaming of the video content. In one specific example, such a format and/or specification may require that both non-comment tags and comments must begin with a particular character, such as a # character. Additionally, such a format and/or specification may require that non-comment tags are to begin with the characters # EXT, while all other lines that begin with the # character are comments.

As an example, comment 316 includes information for respective future encoded segment 216. In some examples, this information may include a uniform resource identifier (URI), name, and/or other data that identifies segment 216. Comment 316 may also indicate a location or other information for requesting and retrieving the segment 216. Also, in some examples, comment 316 may also include other information associated with segment 216, such as a segment duration, a byte range, discontinuity information, an associated date and time, information for decrypting segment 211, and/or any other types of information (e.g., to the extent that such information may be known or predicted at the time that the playlist is generated). Each of comments 317 and 318 may include the same and/or different information for each of their respective segments 217 and 218.

In some cases, not all players may be capable of requesting and processing future encoded segments 216-218. For example, in some cases, only certain players may be programmed with logic to submit requests for segments 216-218 that have not yet been fully encoded and to wait for encoded portions of those segments to be made available by the encoder. By contrast, other players may be traditional players that are not programmed with such logic and that may fail or enter an error condition if they were to request a future encoded segment 216-218. Thus, by including information for future encoded segments 216-218 within comments 316-318, playlist 146 may be used by both players that are capable of requesting and processing future encoded segments 216-218 as well as traditional players that do not have this capability. For example, in some cases, the players that are capable of requesting and processing future encoded segments 216-218 may be provided with logic to read and process the future encoded segments 216-218 that are included within the playlist comments 316-318. By contrast, the traditional players may simply ignore the comments 316-318 without being made aware of the future encoded segments 216-218, thereby eliminating the possibility that these players will fail or enter an error condition. It is noted however, that while including information for future encoded segments 216-218 within comments 316-318 may provide advantages such as those described above, there is no requirement that information for future encoded segments 216-218 must be included in comments. Thus, in an alternative embodiment, information for future encoded segments 216-218 may be included in non-comment tags or other non-comment data sections of playlist 146. For example, for some cases in which playlist 146 is being provided only to players that are capable of requesting and processing future encoded segments 216-218, information for future encoded segments may sometimes be included in non-comment sections of the playlist 146.

In some examples, inclusion of future encoded segments in playlists may also improve video streaming by helping to ensure that the playlists are not out-of-date when they are eventually received by the player 150. For example, in some cases, there may be a time delay between a time that the playlist is generated (e.g., by encoder 123) and a time that the playlist is eventually received by the player 150. In some examples, this time delay may be increased in scenarios when video content passes through an intermediary, such as one or more intermediate content delivery networks (CDNs) and/or other components, which may be between the encoder 123 and the player 150. In some cases, if this time delay becomes long enough, a playlist may become out-of-date by the time that it is received by the player 150, for example when all of the segments included in the playlist have already been requested by the player 150. Thus, by including additional future encoded segments in a playlist, the likelihood that the playlist will become out-of-date when it is received by the player 150 may be reduced.

In some examples, it may be advantageous for video streaming service 120 to estimate an expected delay time that will be required for a playlist to be transmitted from the encoder 123 to the player 150. In some examples, this expected delay time may be estimated based on feedback from the player 150 regarding current and/or recent network conditions (e.g., download speed information) and/or based on historical data regarding transmissions to the player 150 and/or to intermediate components or networks. The video streaming service may use this estimated delay time to determine an estimated quantity of segments that may be played during the estimated delay time. As a specific example, consider a scenario in which it is estimated that it will take 5.0 seconds to transmit a playlist from an encoder 123 to a player 150. Now assume that each segment of transmitted video content is determined to have a duration of 2.0 seconds. In this example, it may be determined that 2.5 segments will be played during the time that it will take the playlist to be transmitted from the encoder 123 to the player 150. Accordingly, in this example, it may be determined that, to help ensure that the playlist is not out-of-date by the time it is received by the player 150, the playlist should include at least as many future encoded segments as are estimated to be played while the playlist is being transmitted from the encoder 123 to the player 150. Thus, in the above example, it may be determined that the playlist should include at least three future encoded segments (having a duration of 6.0 seconds) in order to fully cover the 5.0 second transmission time of the playlist from the encoder 123 to the player 150.

Figure 4:
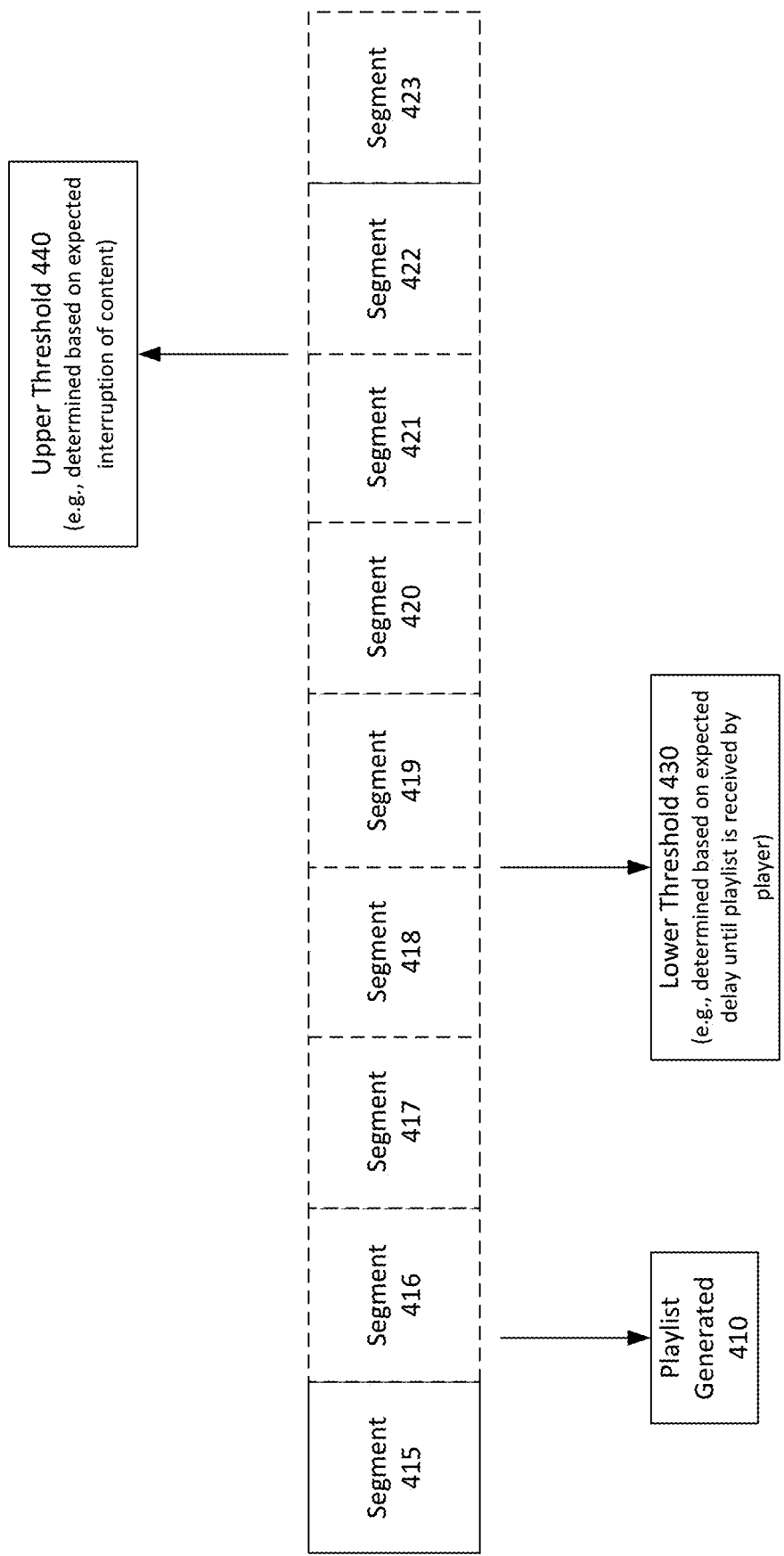
FIG. 4 is a diagram illustrating example upper and lower thresholds of future encoded segments that may be used in accordance with the present disclosure.

Referring now to FIG. 4, some examples of upper and lower thresholds of future encoded segments for a playlist will now be described in detail. As shown in FIG. 4, a playlist may be generated at time 410. Additionally, segment 415 is a currently encoded segment that has been fully encoded at, or prior to, time 410 (as indicated by the solid outlining of segment 415). Furthermore, segments 416-423 are future encoded segments that have not yet been fully encoded at time 410 (as indicated by the dashed outlining of segments 416-423). In the example of FIG. 4, the playlist generated at time 410 may include at least a minimum number of future encoded segments that is determined based, at least in part, on lower threshold 430. In some examples, lower threshold 430 may be determined based, at least in part, on an expected delay until the playlist is received by the player. In particular, in the example scenario set forth above, it was determined that the playlist should include at least three future encoded segments (having a duration of 6.0 seconds) in order to fully cover the 5.0 second transmission time of the playlist from the encoder 123 to the player 150. Thus, in this example, lower threshold 430 is positioned at the end of segment 418 in order to indicate that the playlist should include at least three future segments, which, in this example, are segments 417, 418 and 419.

In some examples, in addition to a lower threshold 430, the quantity of future encoded segments to include in a playlist may also be determined based, at least in part, on an upper threshold 440. In some examples, the upper threshold 440 may be determined based, at least in part, on an expected interruption of the video content. For example, in some cases, a transmission of video content may be interrupted, such as to replace portions of the video content with advertisements, notifications, or other secondary content. In such cases, if the streaming service is aware that an advertisement may potentially replace certain segments of video content, then the streaming service may not wish to include those segments in a playlist. As a specific example, in the case of FIG. 4, the video streaming service may determine that segments 422 and 423 will not be transmitted to the player and will instead be replaced with advertising content. In this example, the video streaming service may set an upper threshold 440 at the end of segment 421, such that segments 422 and 423 are not included as future encoded segments in the playlist. Thus, in the example of FIG. 4, the resulting playlist may include at least future encoded segments 416, 417 and 418 and may be restricted from including future encoded segments 422 and 423. Intermediate segments 419, 420 and 421 may be optionally included in the playlist depending upon various preferences of the video streaming service, player, etc.

Figure 5A:
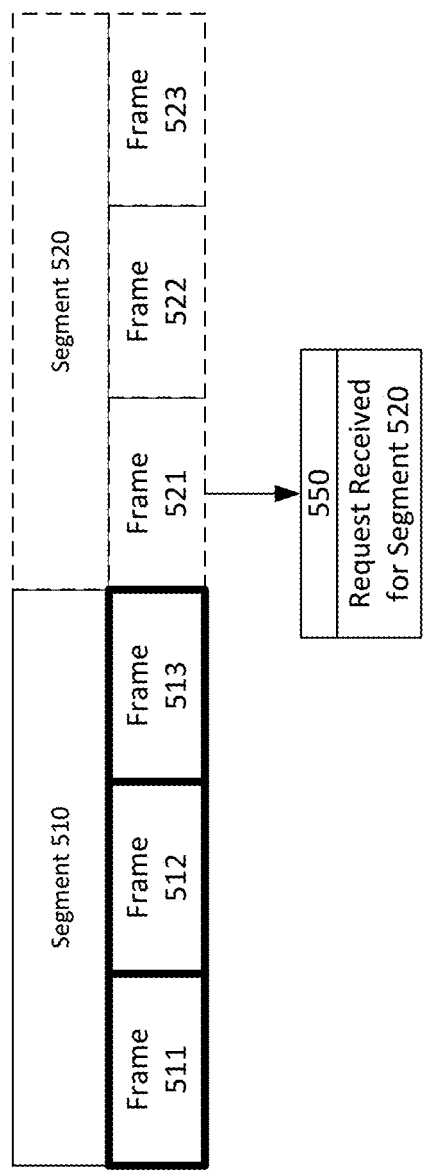
FIGS. 5A-5D are diagrams illustrating example processing of a segment request that may be used in accordance with the present disclosure.

In some cases, the inclusion of future encoded segments in a playlist may result in a player requesting a segment that has not yet been fully encoded (e.g., that is only partially encoded or not encoded at all) at the time that the request is received by the server. In some examples, even though the segment is not yet fully encoded, the server may nevertheless save and process the request, for example by transmitting encoded portions (e.g., frames) of the requested segment as those portions are made available by the encoder. Referring now to FIGS. 5A-5D, some examples of processing of a request for a not yet fully encoded segment will now be described in detail. In particular, FIG. 5A depicts two segments 510 and 520. Segment 510 includes frames 511, 512 and 513, while segment 520 includes frames 521, 522 and 523. As shown, at a time 550, a request is received by a server, from a player, for the server to transmit segment 520 to the player. At time 550, segment 510 has already been fully encoded (as indicated by the solid outlining surrounding segment 510 and frames 511, 512 and 513). Additionally, at time 550, segment 520 has yet to be fully encoded (as indicated by the dashed outlining surrounding segment). More specifically, at time 550, it can be seen that none of frames 521, 522 or 523 have been fully encoded (as indicated by the dashed outlining surrounding each of frames 521, 522 and 523). Thus, at time 550, because segment 520 has not yet been fully encoded, the server cannot immediately transmit the segment 520 to the player. However, as will be described in detail below, the server may nevertheless save and process the request, for example by transmitting encoded portions (e.g., frames) of the requested segment 520 as those portions are made available by the encoder.

Figure 5B:
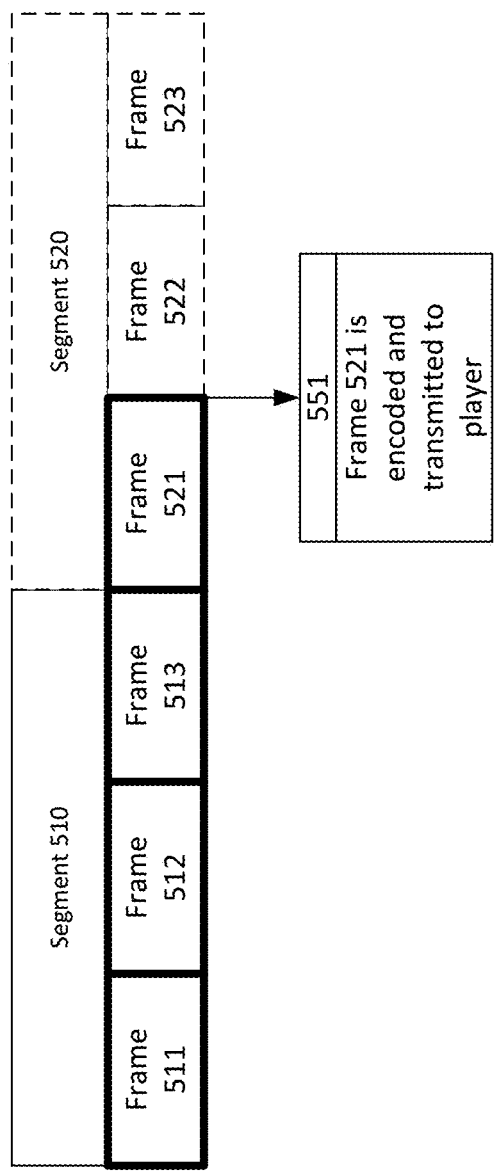

In particular, referring now to FIG. 5B, it is seen that, at a subsequent time 551, frame 521 has become fully encoded and made available for transmission (as indicated by the bold outlining surrounding frame 521 in FIG. 5B). Thus, at time 551 (or shortly thereafter), frame 521 may be transmitted (or may begin to be transmitted) to the player (even though frames 522 and 523 have not yet been fully encoded). It is noted that there is no requirement that frame 521 must be transmitted all at once to the player, but may instead be broken up into any number of bits, bytes, and/or other separately transmitted data portions.

Figure 5C:
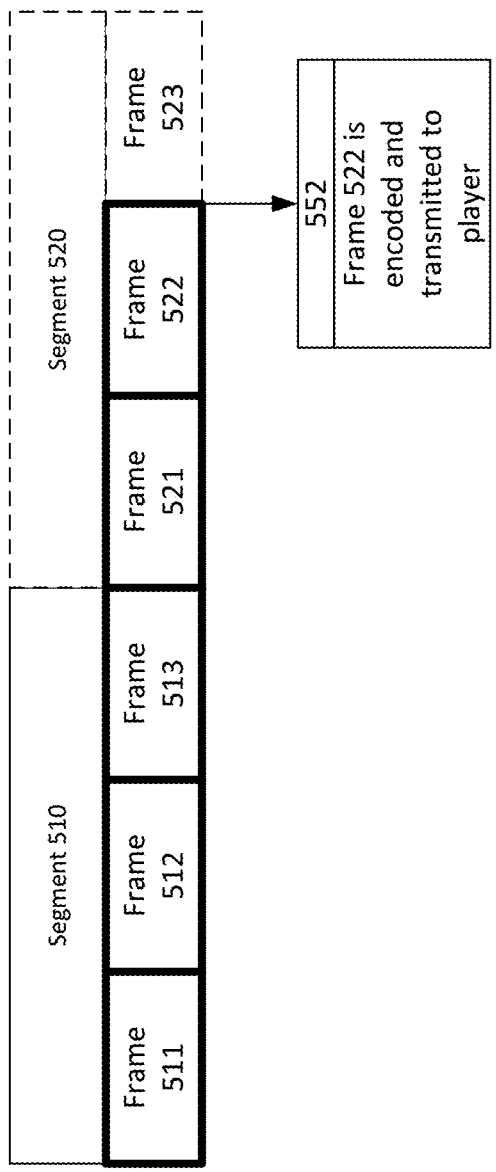

Referring now to FIG. 5C, it is seen that, at a subsequent time 552, frame 522 has become fully encoded and made available for transmission (as indicated by the bold outlining surrounding frame 522 in FIG. 5C). Thus, at time 552 (or shortly thereafter), frame 522 may be transmitted (or may begin to be transmitted) to the player (even though frame 523 has not yet been fully encoded). It is noted that there is no requirement that frame 522 must be transmitted all at once to the player, but may instead be broken up into any number of bits, bytes, and/or other separately transmitted data portions.

Figure 5D:
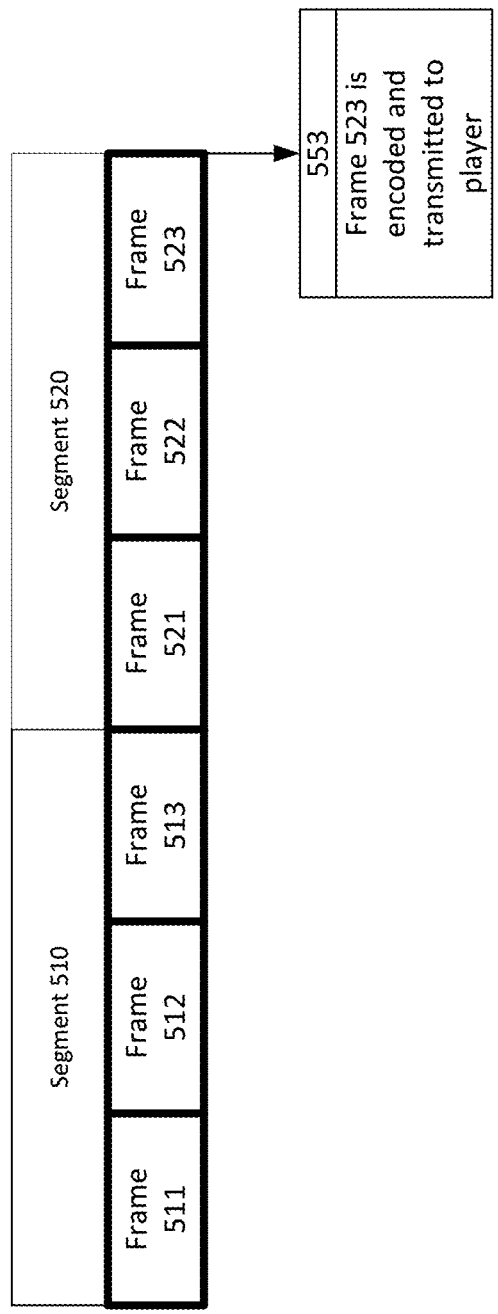

Referring now to FIG. 5D, it is seen that, at a subsequent time 553, frame 523 has become fully encoded and made available for transmission (as indicated by the bold outlining surrounding frame 523 in FIG. 5D). Thus, at time 553 (or shortly thereafter), frame 523 may be transmitted (or may begin to be transmitted) to the player (even though frame 523 has not yet been fully encoded). It is noted that there is no requirement that frame 523 must be transmitted all at once to the player, but may instead be broken up into any number of bits, bytes, and/or other separately transmitted data portions.

The ability to process requests in a manner such as shown in FIGS. 5A-5D may provide a number of advantages. For example, by having its requests saved and processed as encoded content become available, the player may be spared from having to re-issue multiple duplicate requests for the same segment, thereby reducing computational burden on the player and improving efficiency. Additionally, by transmitting encoded portions of the requested segment as those portions are made available by the encoder, the encoded content may be transmitted more promptly to the player, thereby further reducing latency.

Figure 6:
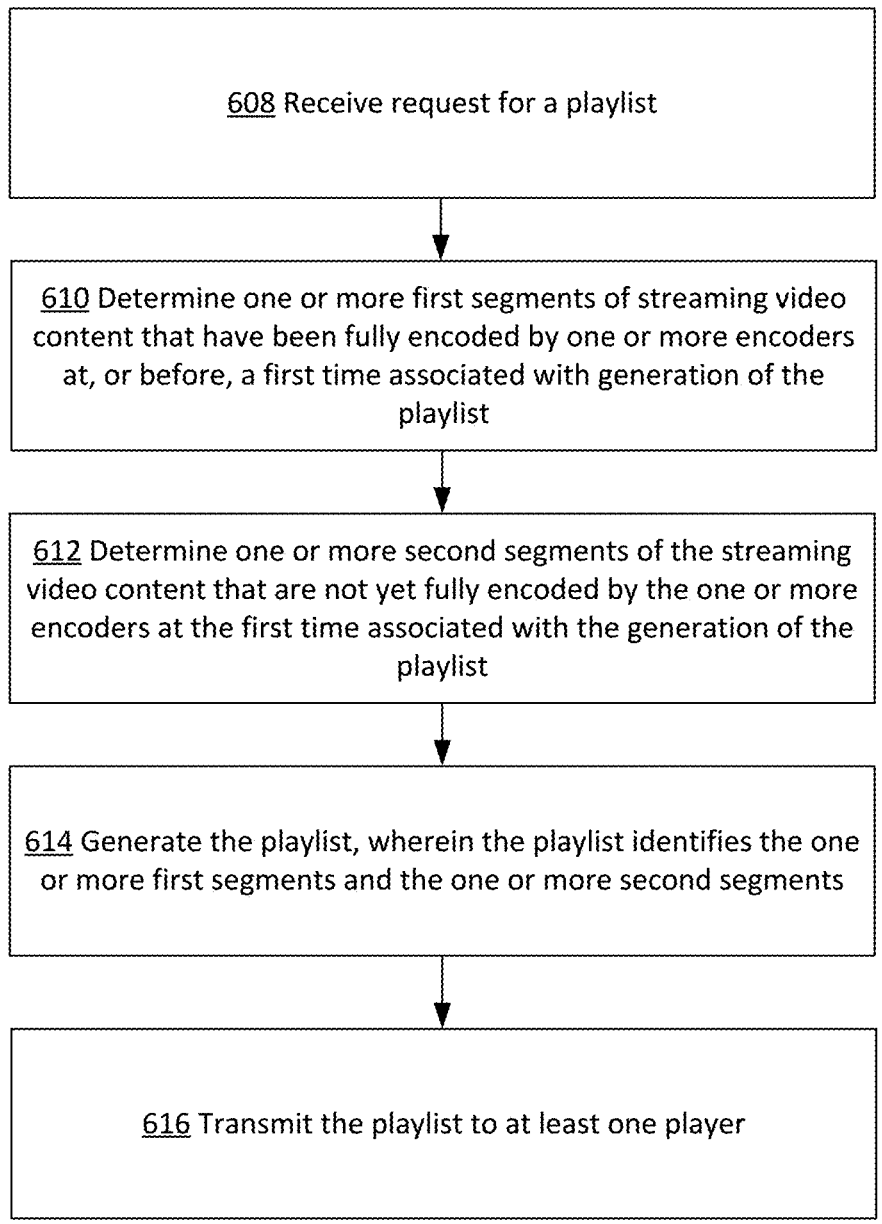
FIG. 6 is a flowchart illustrating an example process for providing a playlist for requesting of streaming video content that may be used in accordance with the present disclosure.

FIG. 6 is a flowchart illustrating an example process for providing a playlist for requesting of streaming video content that may be used in accordance with the present disclosure. As set forth above, in some examples, the streaming video content may include video of an event, and at least part of the streaming video content may be transmitted during a live occurrence of at least part of the event. At operation 608, a request is received for a playlist. The request may be received, for example, by a video streaming service from a player. It is noted that, in some examples, a playlist may be generated without necessarily first being requested by a player. For example, in some cases, playlists may be generated periodically at certain intervals or in response to other events. Thus, there is no requirement that a playlist must be requested by a player in order to be generated. The future encoded segment playlists described herein may, in some cases, be particularly advantageous for scenarios in which a playlist is generated before it is requested. When there is a gap between the time it is requested and the time it is generated, a playlist including future encoded segments may eliminate the broadcast latency caused by this time gap. At operation 610, one or more first segments of the streaming video content that have been fully encoded by one or more encoders at, or before, a first time associated with generation of the playlist are determined. For example, as shown in FIG. 2, segments 211-215 are currently encoded segments that have been fully encoded at, or before, time 210, which is a first time associated with generation of a playlist, such as a time at which the playlist is generated (e.g., a time at which generation of the playlist is initiated or completed). A playlist may often be generated instantaneously or nearly instantaneously. In some examples, the currently encoded segments determined at operation 610 may be determined by the encoder, for example based on a stored record of encoded segments that identifies segments that have been fully encoded by the encoder. Also, in some examples, the segments determined at operation 610 may include all segments that have been fully encoded at, or before, the first time and that have not already been identified as currently encoded segments in a prior playlist (e.g., that have not yet been identified in a non-comment section of a prior playlist).

At operation 612, one or more second segments of the streaming video content that are not yet fully encoded by the one or more encoders at the first time associated with the generation of the playlist are determined. The one or more second segments may become fully encoded subsequent to the first time. For example, as shown in FIG. 2, segments 216-218 are future encoded segments that have not yet been fully encoded at time 210, which is a first time associated with generation of the playlist. In some examples, the future encoded segments determined at operation 612 may be determined by the encoder.

In some examples, the one or more second segments may be determined based, at least in part, on a lower threshold of future encoded segments, for example as depicted in FIG. 4 and described above. Specifically, in some examples, a quantity of the one or more second segments that are identified in the playlist may be determined based, at least in part, on an amount of time associated with transmitting of the playlist to the player, such as an amount of time estimated for transmitting the playlist from the encoder to the client. For example, as described above, to reduce the likelihood that the playlist will be out-of-date upon its receipt by the player, the playlist may include at least enough future encoded segments to cover the estimated amount of time for transmitting the playlist from the encoder to the player. Thus, in this manner, identifying the one or more second segments in the playlist may reduce a likelihood that the playlist will be out-of-date upon receipt by the at least one player in comparison to playlists that do not identify future encoded segments.

Additionally, in some examples, the one or more second segments may be determined based, at least in part, on an upper threshold of future encoded segments, for example as depicted in FIG. 4 and described above. Specifically, in some examples, a quantity of the one or more second segments that are identified in the playlist may be determined based, at least in part, on an interruption in transmission of the streaming video content. For example, in some cases, a determination may be made of one or more segments of the streaming video content that will be interrupted and replaced by secondary content, such as advertising content (e.g., segments 422 and 423 in FIG. 4). In some examples, the playlist may include only future encoded segments that are prior to the upcoming replaced segments.

At operation 614, the playlist is generated. The playlist may identify both the one or more first segments and the one or more second segments. As set forth above, in some examples, the playlist may identify the one or more first segments and/or the one or more second segments using one or more uniform resource identifiers (URIs), names, and/or other data that identifies the segments. The playlist may also include other information associated with the segments, such as a segment duration, a byte range, discontinuity information, an associated date and time, information for decrypting the segments, and/or any other types of information. In some examples, the one or more second segments (e.g., future encoded segments) may be identified in one or more comment fields of the playlist, while the one or more first segments (e.g., currently encoded segments) may be identified in one or more tags or other non-comment fields of the playlist. As set forth above, identifying the one or more second segments in the playlist may allow fewer playlist updates during transmission of the streaming video content in comparison to playlists that do not identify future encoded segments.

At operation 616, the playlist is transmitted to at least one player. As set forth above, in some examples, the playlist may be transmitted to both players that are capable of successfully requesting segments that are not yet fully encoded and to players that are not capable of successfully issuing such requests. For example, by identifying the one or more second segments (e.g., future encoded segments) in comment fields, the playlist may identify segments that are not yet fully encoded to players that are capable of successfully issuing requests for those segments, such as when those players are provided with instructions to parse and process the comment fields. By contrast, players that are not capable of successfully issuing requests for not yet fully encoded segments may simply ignore the comments, thereby eliminating the possibility of errors resulting from failed attempts to request those segments. As set forth above, upon receiving the playlists, the players may request one or more of the segments identified in the playlist, including one or more of the first segments and or one or more of the second segments. The video streaming service may then receive and process those requests by transmitting the requested segments to the player. The player may then receive and play the requested segments to a viewer. The player may also request additional playlists (e.g., playlist updates) for subsequent segments of video content.

Figure 7:
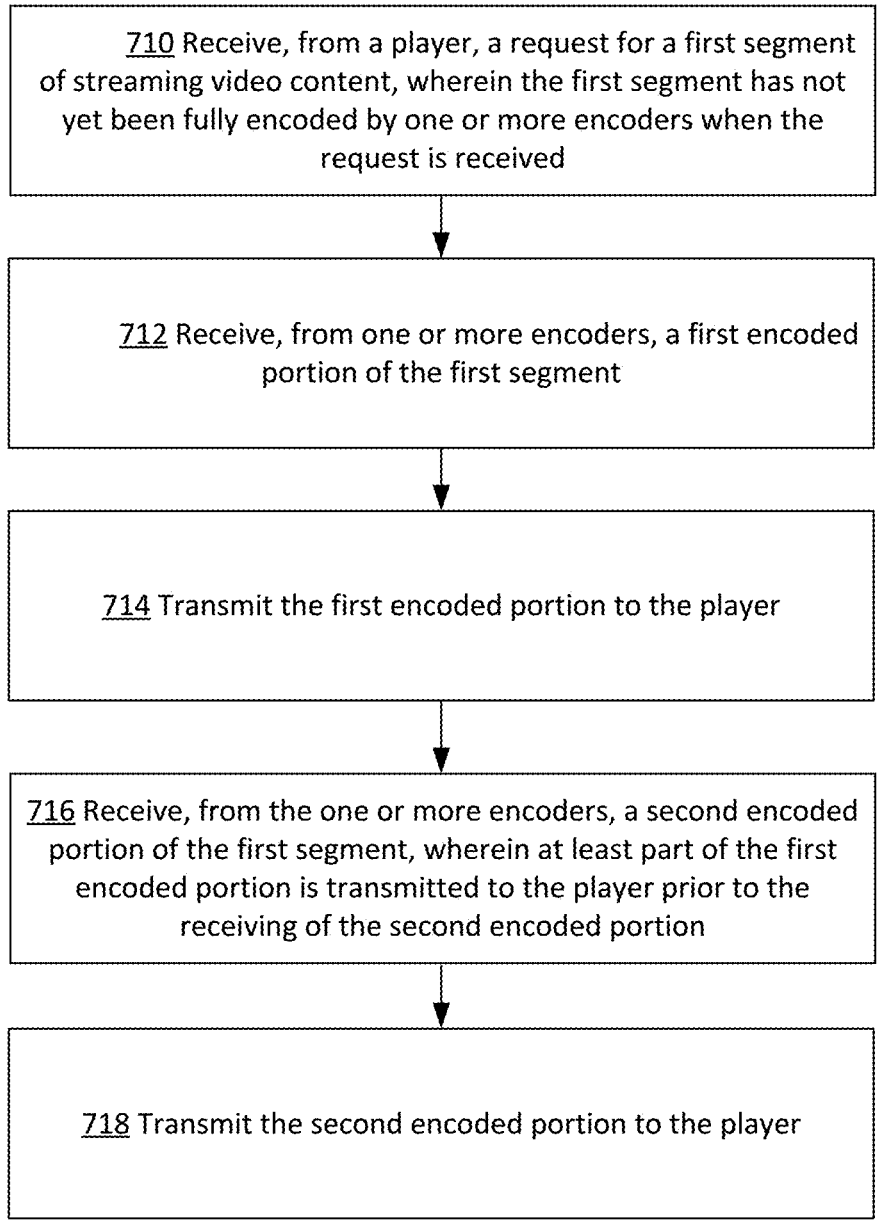
FIG. 7 is a flowchart illustrating an example process for transmission of streaming video content that may be used in accordance with the present disclosure.

As set forth above, when a playlist identifies future encoded segments, a player may sometimes request a segment that is not yet fully encoded at the time that the request is received by the server. FIG. 7 is a flowchart illustrating an example process for transmission of streaming video content including such a segment. As set forth above, in some examples, the streaming video content may include video of an event, and at least part of the streaming video content may be transmitted during a live occurrence of at least part of the event. At operation 710, a request is received from a player, for example by a server and/or edge node. The request is for a first segment of streaming video content, and the first segment has not yet been fully encoded by one or more encoders when the request is received (e.g., when the request is received by the server and/or edge node). For example, as shown in FIG. 5A, at a time 550, a request is received by a server, from a player, for the server to transmit segment 520 to the player. At time 550, segment 520 has yet to be fully encoded (as indicated by the dashed outlining surrounding segment 520). More specifically, at time 550, it can be seen that none of frames 521, 522 or 523 have been fully encoded (as indicated by the dashed outlining surrounding each of frames 521, 522 and 523). Thus, at time 550, because segment 520 has not yet been fully encoded, the server cannot immediately transmit the segment 520 to the player. In some examples, frame 521 may be partially encoded by the one or more encoders at the time 550 that the request is received. In other examples, frame 521 may be entirely un-encoded by the one or more encoders at the time 550 that the request is received. The first segment (e.g., segment 520) may be identified in a playlist that is generated by the one or more encoders before the first segment is fully encoded and may be identified in a comment of the playlist.

At operation 712, a first encoded portion (e.g., frame) of the first segment is received (e.g., by the edge node) from one or more encoders. For example, as shown in FIG. 5B, at a subsequent time 551, frame 521 has become fully encoded (as indicated by the bold outlining surrounding frame 521 in FIG. 5B). Upon being fully encoded, frame 521 may be received by the edge node from the encoder.

At operation 714, the first encoded portion (e.g., frame 521) is transmitted to the player. In some examples, frame 521 may be transmitted (or at least partially transmitted) to the player even though frames 522 and 523 have not yet been fully encoded.

At operation 716, a second encoded portion (e.g., frame) of the first segment is received (e.g., by the edge node) from one or more encoders. For example, as shown in FIG. 5C, at a subsequent time 552, frame 522 has become fully encoded (as indicated by the bold outlining surrounding frame 522 in FIG. 5C). Upon being fully encoded, frame 522 may be received by the edge node from the encoder. In some examples, at least part of the first encoded portion (e.g., frame 521) may be transmitted to the player prior to the receiving of the second encoded portion (e.g., frame 522) at operation 716. For example, in some cases, the edge node may transmit at least part of frame 521 to the player prior to receiving encoded frame 522 from the encoder.

At operation 718, the second encoded portion (e.g., frame 522) is transmitted to the player. As set forth above, frame 522 may be transmitted (or at least partially transmitted) to the player even though frame 523 has not yet been fully encoded. In some examples, operations 712-718 may be repeated for each successive portion (e.g., frame) of the first segment until the first segment is fully transmitted to the player. For example, as shown in FIG. 5D, frame 523 of segment 520 may eventually be received and transmitted to the player. Thus, in some examples, the process of FIG. 7 may allow the request for the first segment to be processed without requiring the first player to resubmit the request. For example, the player is not required to wait and resubmit a duplicate request after segment 520 has been fully encoded. Rather, the single request for segment 520 from the player may be saved and processed by the server as frames 521-523 become encoded and are made available for transmission.

Referring back to FIG. 1, it is noted that, in some examples, video transmitted from data capture node 110 to video streaming service 120 may already be encoded by data capture node 110 for transmission to video streaming service 120. In some of these examples, video streaming service 120 may reformat the video from a first protocol or format (e.g., a protocol or format used for transmission from data capture node 110 to video streaming service 120) to a second protocol or format (e.g., a protocol or format used for transmission from video streaming service 120 to player 150). It is noted that the term encoding, as used herein, is intended to include both encoding of non-encoded video as well as converting or reformatting of encoded video from one protocol or format to another protocol or format. Similarly, an encoder may include components that encode non-encoded video as well as components that merely convert or reformat video from one protocol or format to another protocol or format. Thus, the processes of FIGS. 6 and 7 may also be employed in scenarios in which video streaming service 120 does not encode previously un-encoded video but instead converts or reformats encoded video from one protocol or format to another. In some examples, the video streaming service may generate a playlist for this converted or reformatted video, such as may include segments that have not yet been fully encoded (e.g., converted or reformatted) at the time that the playlist is generated.

Figure 8:
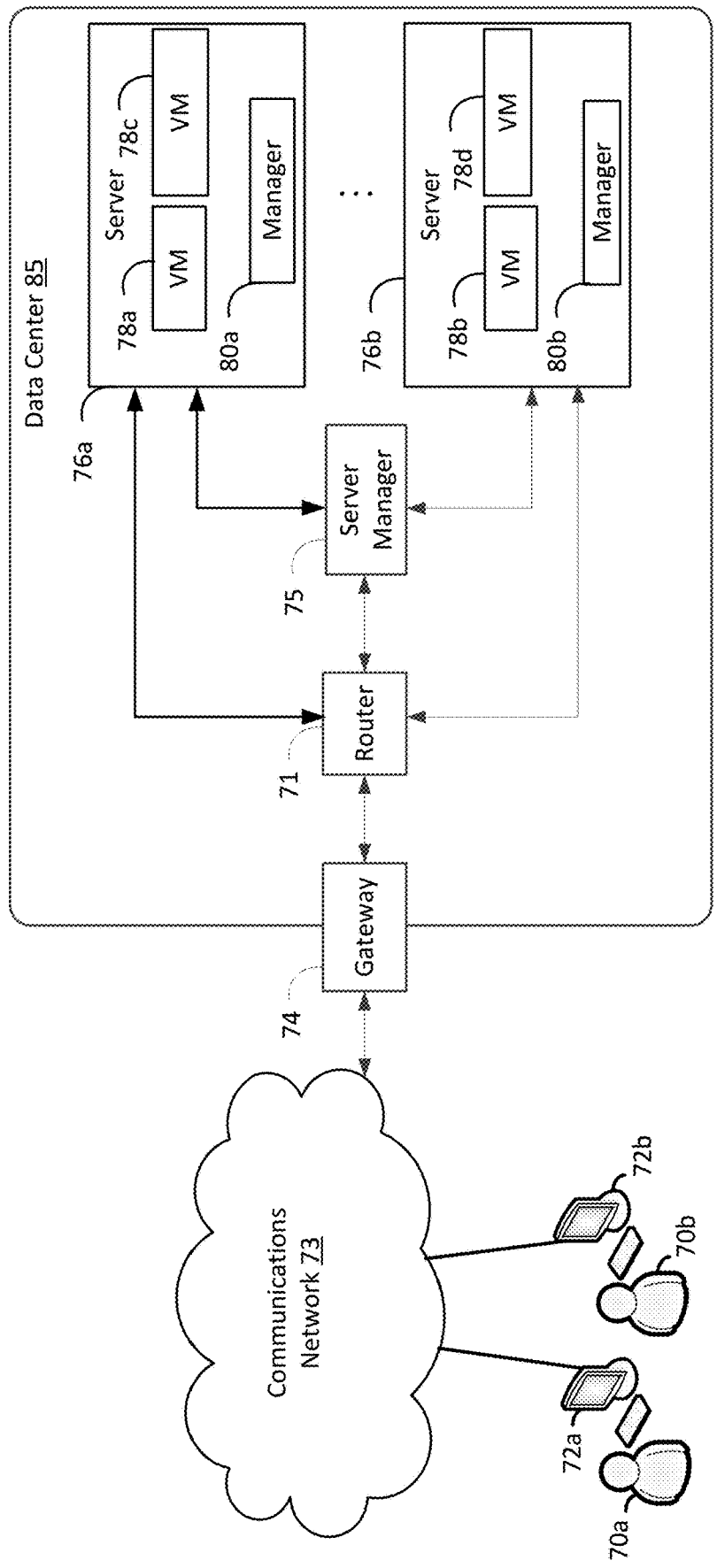
FIG. 8 is a diagram illustrating an example system for transmitting and providing data that may be used in accordance with the present disclosure.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76a and 76b. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
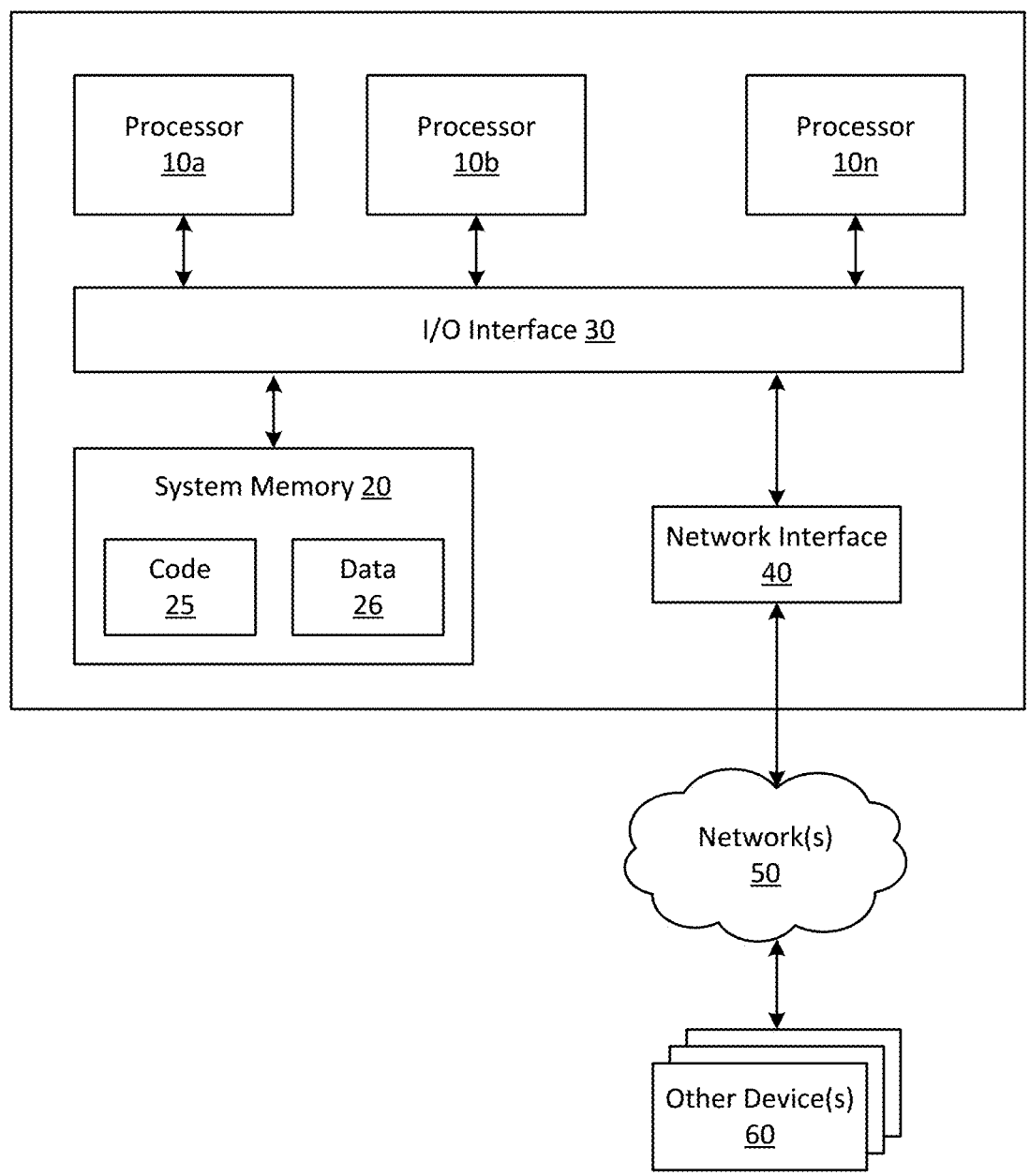
FIG. 9 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for providing a playlist for requesting of streaming video content comprising:
   one or more processors; and
   one or more memories having stored therein instructions that, upon execution by the one or more processors, cause the computing system perform operations comprising:
      determining one or more first segments of the streaming video content that have been fully encoded by one or more encoders at, or before, a first time associated with generation of the playlist;
      determining one or more second segments of the streaming video content that are not yet fully encoded by the one or more encoders at the first time associated with the generation of the playlist, wherein the one or more second segments become fully encoded by the one or more encoders subsequent to the first time;
      generating the playlist, wherein the playlist identifies both the one or more first segments and the one or more second segments, wherein the one or more second segments are identified in one or more comment fields of the playlist and the one or more first segments are identified in one or more non-comment fields of the playlist; and
      transmitting the playlist to at least one player.

2. The computing system of claim 1, wherein the streaming video content includes video of an event, and wherein at least part of the streaming video content is transmitted during a live occurrence of at least part of the event.

3. The computing system of claim 1, wherein a quantity of the one or more second segments that are identified in the playlist is determined based, at least in part, on an amount of time associated with the transmitting of the playlist to the player.

4. The computing system of claim 1, wherein a quantity of the one or more second segments that are identified in the playlist is determined based, at least in part, on an interruption in transmission of the streaming video content.

5. A computer-implemented method for providing a playlist for requesting of streaming video content comprising:
   determining one or more first segments of the streaming video content that have been fully encoded by one or more encoders at, or before, a first time associated with generation of the playlist;
   determining one or more second segments of the streaming video content that are not yet fully encoded by the one or more encoders at the first time associated with the generation of the playlist, wherein the one or more second segments become fully encoded by the one or more encoders subsequent to the first time;
   generating the playlist, wherein the playlist identifies both the one or more first segments and the one or more second segments, wherein the one or more second segments are identified in one or more comment fields of the playlist and the one or more first segments are identified in one or more non-comment fields of the playlist; and
   transmitting the playlist to at least one recipient.

6. The computer-implemented method of claim 5, wherein a quantity of the one or more second segments that are identified in the playlist is determined based, at least in part, on an amount of time associated with the transmitting of the playlist to the at least one recipient.

7. The computer-implemented method of claim 5, wherein a quantity of the one or more second segments that are identified in the playlist is determined based, at least in part, on an interruption in transmission of the streaming video content.

8. The computer-implemented method of claim 5, wherein the streaming video content includes video of an event, and wherein at least part of the streaming video content is transmitted during a live occurrence of at least part of the event.

9. The computer-implemented method of claim 5, wherein identifying the one or more second segments in the playlist allows fewer playlist updates during transmission of the streaming video content in comparison to playlists that do not identify future encoded segments.

10. The computer-implemented method of claim 5, wherein identifying the one or more second segments in the playlist reduces a likelihood that the playlist will be out-of-date upon receipt by the at least one recipient in comparison to playlists that do not identify future encoded segments.

11. One or more non-transitory computer-readable storage media having stored thereon instructions that, upon execution by one or more computing devices, cause the one or more computing devices to perform operations comprising:
   determining one or more first segments of streaming video content that have been fully encoded by one or more encoders at, or before, a first time associated with generation of a playlist;
   determining one or more second segments of the streaming video content that are not yet fully encoded by the one or more encoders at the first time associated with the generation of the playlist, wherein the one or more second segments become fully encoded by the one or more encoders subsequent to the first time;
   generating the playlist, wherein the playlist identifies both the one or more first segments and the one or more second segments, wherein the one or more second segments are identified in one or more comment fields of the playlist and the one or more first segments are identified in one or more non-comment fields of the playlist; and transmitting the playlist to at least one recipient.

12. The one or more non-transitory computer-readable storage media of claim 11, wherein a quantity of the one or more second segments that are identified in the playlist is determined based, at least in part, on an amount of time associated with the transmitting of the playlist to the at least one recipient.

13. The one or more non-transitory computer-readable storage media of claim 11, wherein a quantity of the one or more second segments that are identified in the playlist is determined based, at least in part, on an interruption in transmission of the streaming video content.

14. The one or more non-transitory computer-readable storage media of claim 11, wherein the streaming video content includes video of an event, and wherein at least part of the streaming video content is transmitted during a live occurrence of at least part of the event.

15. The one or more non-transitory computer-readable storage media of claim 11, wherein identifying the one or more second segments in the playlist allows fewer playlist updates during transmission of the streaming video content in comparison to playlists that do not identify future encoded segments.

16. The one or more non-transitory computer-readable storage media of claim 11, wherein identifying the one or more second segments in the playlist reduces a likelihood that the playlist will be out-of-date upon receipt by the at least one recipient in comparison to playlists that do not identify future encoded segments.

* * * * *